US012229304B2

(12) United States Patent
Banipal et al.

(10) Patent No.: US 12,229,304 B2
(45) Date of Patent: Feb. 18, 2025

(54) SECURE DATA ANALYTICS (71) Applicant: INTERNATIONAL BUSINESS MACHINES CORPORATION, Armonk, NY (US)

(72) Inventors: Indervir Singh Banipal, Austin, TX (US); Shikhar Kwatra, San Jose, CA (US); Park Foreman, Austin, TX (US); Caleb Miles, Columbia, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 823 days.

(21) Appl. No.: 17/307,553

(22) Filed: May 4, 2021

(65) Prior Publication Data
US 2022/0358237 A1    Nov. 10, 2022

(51) Int. Cl.
G06F 21/62 (2013.01)
G06F 9/54 (2006.01)
(Continued)

(52) U.S. Cl.
CPC .......... *G06F 21/6245* (2013.01); *G06F 9/547* (2013.01); *G06F 21/602* (2013.01); *G06N 20/00* (2019.01); *H04L 9/008* (2013.01)

(58) Field of Classification Search
CPC .... G06F 21/6245; G06F 9/547; G06F 21/602; G06N 20/00; H04L 9/008
See application file for complete search history.

(56) References Cited

U.S. PATENT DOCUMENTS 8,627,070 B2    1/2014  Aggarwal et al.
9,934,239 B2    4/2018  Gkoulalas-Divanis et al.
(Continued)

FOREIGN PATENT DOCUMENTS

CN    111752969 A    10/2020
WO    2017187207 A1   11/2017
(Continued)

OTHER PUBLICATIONS

API Wikipedia Article (Year: 2023).*
(Continued)

*Primary Examiner* — Kendall Dolly
*Assistant Examiner* — Thomas A Carnes
(74) *Attorney, Agent, or Firm* — Rakesh Roy, Esq.; Matthew M. Hulihan, Esq.; Heslin Rothenberg Farley & Mesiti P.C.

(57) ABSTRACT

Secure data analytics is provided via a process that identifies sensitive data fields of an initial dataset and mappings between the sensitive data fields and other data fields of the dataset, where analytics processing is to be performed on the initial dataset, then, based on an expectation of data fields, of the initial data set, to be used in performance of the analytics processing and on the identified sensitive data fields, selects and applies a masking method to the initial dataset to mask the sensitive data fields and produce a masked dataset, provides the masked dataset to an analytics provider with a request for the analytics processing, and receives, in response, a generated analytics function, generated based on the masked dataset, that is configured to perform the analytics processing, and invokes the generated analytics function against the initial dataset to perform the analytics processing on the initial dataset.

20 Claims, 6 Drawing Sheets (51) Int. Cl.
*G06F 21/60* (2013.01)
*G06N 20/00* (2019.01)
*H04L 9/00* (2022.01)

(56) References Cited

U.S. PATENT DOCUMENTS

| | | | |
|---|---|---|---|
| 9,977,920 | B2 | 5/2018 | Danielson et al. |
| 10,229,287 | B2 | 3/2019 | Nerurkar et al. |
| 10,733,320 | B2 | 8/2020 | Nerurkar et al. |
| 10,817,619 | B1* | 10/2020 | Kolli ................. G06F 21/552 |
| 11,343,068 | B2* | 5/2022 | Nandakumar ........ G06N 3/084 |
| 2007/0143289 | A1 | 6/2007 | Dwork et al. |
| 2009/0319526 | A1 | 12/2009 | Aggarwal et al. |
| 2014/0351043 | A1 | 11/2014 | Agarwal |
| 2015/0379072 | A1* | 12/2015 | Dirac ................. G06N 20/00 707/693 |
| 2016/0042197 | A1 | 2/2016 | Gkoulalas-Divanis et al. |
| 2017/0169253 | A1 | 6/2017 | Curcio et al. |
| 2018/0191780 | A1 | 7/2018 | Das et al. |
| 2019/0141052 | A1 | 5/2019 | Nerurkar et al. |
| 2020/0125753 | A1 | 4/2020 | Yang et al. |
| 2020/0184080 | A1* | 6/2020 | Trim ..................... G06F 21/84 |
| 2020/0242466 | A1* | 7/2020 | Mohassel ........... G06F 21/6254 |
| 2020/0280430 | A1* | 9/2020 | Tueno ................... H04L 9/008 |
| 2020/0403781 | A1* | 12/2020 | Gentry ................. G06F 21/602 |
| 2021/0036995 | A1 | 2/2021 | Guo et al. |
| 2021/0064779 | A1* | 3/2021 | Krishnan ................. H04L 9/30 |
| 2022/0179991 | A1* | 6/2022 | Jha ..................... G06F 11/3065 |
| 2022/0335158 | A1* | 10/2022 | Xu ....................... G06F 21/6227 |
| 2022/0358237 | A1* | 11/2022 | Banipal ................. H04L 9/0894 |
| 2023/0153686 | A1* | 5/2023 | Waller ................. G06F 21/602 706/12 |
| 2023/0259654 | A1* | 8/2023 | Jalal ..................... G06F 21/6254 726/26 |

FOREIGN PATENT DOCUMENTS

| | | |
|---|---|---|
| WO | WO2020103154 A | 5/2020 |
| WO | 2020248149 A1 | 12/2020 |

OTHER PUBLICATIONS

Data Shuffling/Masking Wikipedia Article (Year: 2022).*
Data Shuffling/Masking Talend Article (Year: 2024).*
Quoc et al. "Privacy preserving stream analytics: The marriage of randomized response and approximate computing." arXiv preprint arXiv:1701.05403 (2017), 23 pgs.
Mell, Peter, et al., "The NIST Definition of Cloud Computing", NIST Special Publication 800-145, Sep. 2011, Gaithersburg, MD, 7 pgs.
"IBM Security Products", retrieved on Feb. 18, 2021 from the Internet URL: <https://www.ibm.com/security/products>, 16 ogs.
"IBM Security", retrieved on Feb. 18, 2021 from the Internet URL: <https://www.ibm.com/security>, 5 pgs.
"Cybersecurity Services", retrieved on Feb. 18, 2021 from the Internet: <https://www.ibm.com/security/services>, 8 pgs.
"Accelerate your journey to AI with a prescriptive approach", retrieved on Feb. 18, 2021 from the Internet URL: <https://www.ibm.com/analytics>, 7 pgs.
International Search Report and Written Opinion for PCT/CN2022/088195 completed Jul. 14, 2022 (mailed Jul. 21, 2022), 9 pgs.

* cited by examiner

FIG. 1

| First Name | Last Name | Date of Birth | Identification Number | Locale |
|---|---|---|---|---|
| Tobias | Baumer | 1/1/1982 | 04-11587431 | Europe |
| John | Smith | 4/22/1976 | 123-45-6789 | United States |
| . | . | . | . | . |
| . | . | . | . | . |
| . | . | . | . | . |
| . | . | . | . | . |
| Ryan | James | 9/28/2000 | 098-76-5432 | United States |

SECURE DATA ANALYTICS

BACKGROUND

Analytics providers are organizations with expertise in analyzing data, particularly large datasets, to extract insights and other valuable information therefrom. While some data owners perform their own analytics, it is common for them to engage outside data analytics providers to perform analytics on their data. Conventionally this requires the data owner to give the analytics provider the data or at least access to the data in order for the provider to perform the analytics.

SUMMARY

Shortcomings of the prior art are overcome and additional advantages are provided through the provision of a computer-implemented method. The method identifies sensitive data fields of an initial dataset, on which analytics processing is to be performed, and mappings between the sensitive data fields and other data fields of the dataset. Based on an expectation of data fields, of the initial data set, to be used in performance of the analytics processing on the initial dataset, and based further on the identified sensitive data fields, the method selects and applies a masking method to the initial dataset to mask the sensitive data fields of the initial dataset and produce a masked dataset. The method provides the masked dataset to an analytics provider with a request for the analytics processing, and receives, in response to the providing, a generated analytics function, generated based on the masked dataset, that is configured to perform the analytics processing on the initial dataset. The method also invokes the generated analytics function against the initial dataset to perform the analytics processing on the initial dataset.

Further, a computer system is provided that includes a memory and a processor in communication with the memory, wherein the computer system is configured to perform a method. The method identifies sensitive data fields of an initial dataset, on which analytics processing is to be performed, and mappings between the sensitive data fields and other data fields of the dataset. Based on an expectation of data fields, of the initial data set, to be used in performance of the analytics processing on the initial dataset, and based further on the identified sensitive data fields, the method selects and applies a masking method to the initial dataset to mask the sensitive data fields of the initial dataset and produce a masked dataset. The method provides the masked dataset to an analytics provider with a request for the analytics processing, and receives, in response to the providing, a generated analytics function, generated based on the masked dataset, that is configured to perform the analytics processing on the initial dataset. The method also invokes the generated analytics function against the initial dataset to perform the analytics processing on the initial dataset.

Yet further, a computer program product including a computer readable storage medium readable by a processing circuit and storing instructions for execution by the processing circuit is provided for performing a method. The method identifies sensitive data fields of an initial dataset, on which analytics processing is to be performed, and mappings between the sensitive data fields and other data fields of the dataset. Based on an expectation of data fields, of the initial data set, to be used in performance of the analytics processing on the initial dataset, and based further on the identified sensitive data fields, the method selects and applies a masking method to the initial dataset to mask the sensitive data fields of the initial dataset and produce a masked dataset. The method provides the masked dataset to an analytics provider with a request for the analytics processing, and receives, in response to the providing, a generated analytics function, generated based on the masked dataset, that is configured to perform the analytics processing on the initial dataset. The method also invokes the generated analytics function against the initial dataset to perform the analytics processing on the initial dataset.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for secure data analytics. Concerns can arise when an outside analytics provider (AP) is contracted to perform analytics on a dataset held or controlled by another entity, for example the data owner or provider. Typically, the AP will have indiscriminate power to analyze the dataset, which might be, and often is, a large enterprise dataset that contains sensitive data. The dataset might contain private/sensitive information, for instance personally identifiable information, also referred to as sensitive personal information, personally identifying information, personal identifying information, personal identifiable information, personal information, and/or personal data, which may be typically abbreviated "PII" or "SPI". The AP's access to the private information of the users or other entities to which the data pertains poses risks. Such users/entities are termed herein "subjects" or "subject entities" for convenience. The AP or another entity that obtains access to the data might abuse that access by selling private information to third parties not specified in customer agreements, by taking some actions using the data, and/or by deriving some other unauthorized benefits from the data, as examples.

Consequently, at least the following challenges are noted. Protections may be desired to preserve the privacy of the subjects reflected in the data of a dataset to be processed and to prevent the analytics provider from gaining undesired (from the data owner's perspective) insights into private data of the subjects. It may be desired that the data owner of the dataset, the data owner being a customer requesting the analytics to be performed on the dataset by the AP, maintain control over the methods used to mask the data based on the query/queries being run by the analytics provider. It may be further desired for the foregoing to be performed using functional programming where, alongside the data, the logic to execute and perform the analytics can also be provided to the customer for running against the real data in order to help ensure that the accuracy of the analytics models is not affected, that privacy of the subjects is preserved to a greater extent, and that outcomes or results of the analytics remain the same regardless of any masking that was implemented against the dataset before provision to the analytics provider.

Figure 1:
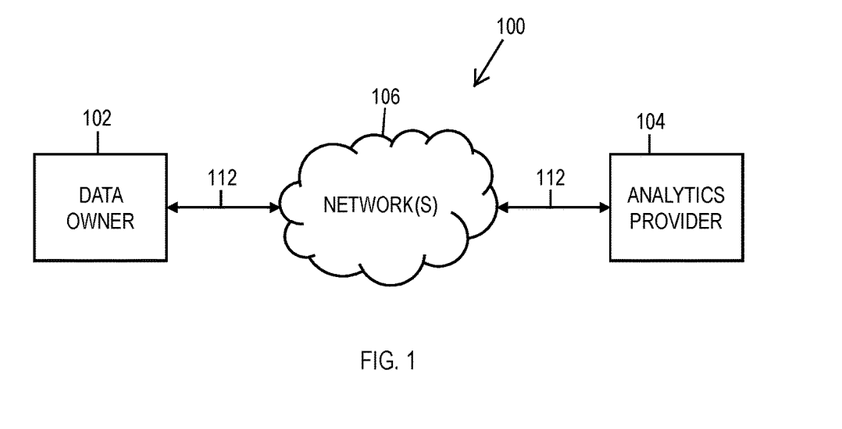
FIG. 1 depicts an example environment to incorporate and use aspects described herein.

FIG. 1 depicts an example environment to incorporate and use aspects described herein. Referring to FIG. 1, environment 100 includes a data owner 102 that holds/owns a dataset of data pertaining to subject entities. Analytics provider 104 is a provider of data analytics, meaning it can receive datasets from its customers (data owners) and then construct and perform analytics processing to process the data according to whatever analytics or insights are requested by the customer. Conceptually between the data owner 102 and analytics provider 104 is/are network(s) 106, which could include not only network infrastructure for network communications but cloud environment(s). In some examples, the data owner 102 holds the dataset on premises, sends the dataset to the analytics provider 106 via network(s) 106, and the analytics provider performs the analytics on its own computer systems before sending results back to the data owner 102. In other examples, some/all aspects of these exchanges are facilitated using cloud platform(s). For instance, the dataset might be stored on a private cloud of the customer (existing as part of network(s) 106) and/or the analytics provider 104 might perform its analytics processing on/using a cloud platform that exists as part of network(s) 106. In any case, the data owner, sometimes referred to herein as the 'customer' of the analytics provider, controls access to and provision of a dataset. On the analytics provider side, the analytics provider receives requests from its customers (data owners) for analytics to be performed against datasets to which it receives access from its customers.

The components in FIG. 1 form wired or wireless network(s) of devices, and communication between the devices takes place via wired or wireless communications links 112 for communicating data between the devices. FIG. 1 is just one example of an environment to incorporate and use aspects described herein; many other examples are possible and contemplated as being compatible with the capabilities described herein.

Aspects described herein provide for dynamic preservation of inter-relational data privacy dependencies and a curation mechanism in a multi-tiered framework for secure data analytics. As part of this, and on the data owner side, various properties of the dataset can be automatically and/or manually identified based on the dataset itself and the metadata (such as schema information) kept about the dataset. Such properties can include characteristics of data fields in the dataset and the mappings and dependencies between data fields, as examples. The data fields correspond to categories of data points kept for the subjects reflected in the dataset. In a relational database, each column or 'attribute' might correspond to a respective data field, for instance.

As an example, a data owner computer system—one owned by or operating on behalf of the data owner—can identify sensitive data fields, i.e. those containing sensitive/ private data. It may be desired to mask aspects of the sensitive data fields, for instance to (i) mask the actual data of those fields (e.g. a social security number) and/or (ii) anonymize/change any mappings between sensitive fields and any personal identifiers (IDs) of a subject entity (e.g. a user). In this regard, mappings and dependencies can exist between data fields to link together the data corresponding to particular subject entities. To help anonymize the data, one option is to change mapping(s) that correlate together all of the data about a subject entity identified in the dataset so that the mappings no longer correlate all of an entity's data to that particular entity. Example changes are to remap or delete the mappings. Additionally or alternatively, actual subject entity attribute data (user name, Social Security Number (SSN), address, telephone number, etc.) could be masked, particularly if changes to mappings are not sufficient to anonymize or decorrelate to one or more attributes from a subject entity.

On the data owner side, the system can also identify non-sensitive fields, i.e. those that do not contain data for which connection to a particular entity is desired to be masked. In this regard, it may be acceptable to preserve any correlation of a subject entity identifier, such as a user ID, to non-sensitive data fields. Sometimes whether a field is sensitive or non-sensitive depends on the context. For instance, in a dataset of all U.S. customers of a company, a data field for the shipping address country may be regarded as non-sensitive since each person represented in the dataset has matching shipping address country (U.S.) and it is not identifying of any particular customer. In contrast, the shipping address country may be regarded as sensitive when dealing with a dataset that reflects just one individual from each of several different countries.

As part of identifying the sensitive and non-sensitive data fields and the mappings and dependencies therebetween, the system can provide to the data owner a recommendation as to which data fields of the dataset are sensitive and/or which are non-sensitive. This can be done in conjunction with recommending a list of candidate data fields that are sensitive and/or to be masked. The recommended list can be subject to change and further customization by the data owner for a final determination of which data fields are to be regarded as sensitive for that particular dataset. For instance, the data owner can add and/or remove sensitive fields from the list. Often, the data owner will understand the impetus for the analytics, current and past analytics requirements, and which data fields have historically been, or should be, masked accordingly. This can be useful in finalizing which data fields are to be regarded as sensitive and masked for purposes of performing the particular analytics that the data owner desires.

In some examples, information representing the analytics requirements can be stored in a particular format (such as Extensible Markup Language (XML) or JavaScript Object Notation (JSON) format) for input into an artificial intelligence (AI)-powered intelligent search and text-analytics platform, such as the Discovery platform offered by International Business Machines Corporation, Armonk, New York, U.S.A. A rule-based custom machine learning/natural language processing model can be established based on current and past usage that is used to train the model to predict the relationships between past analytics and corresponding fields, including those that should be masked on account that the analytics is expected to need access to data of those fields in order to perform the analytics processing. The model can be trained specific to an individual data holder or an aggregate model trained based on information from a collection of different data holders. The model can be trained based on past analytics requirements and maskings to provide suggestions/recommendations about which data fields in a given dataset to mask and which to preserve.

In addition to identifying sensitivity of data fields and mappings existing between the data fields, the system on the data owner side also understands a masking method that is to be applied to mask the sensitive data fields of the dataset and produce a masked dataset. The dataset discussed above that contains sensitive data is termed herein an 'initial' dataset. In accordance with aspects described herein, at least one masking method is selected and applied to this initial dataset to mask sensitive fields of the initial dataset to produce another dataset, termed herein the 'masked' dataset. The data owner can provide the masked dataset to the analytics provider and the analytics provider can use that to construct an analytics function that is configured to perform requested analytics. An analytics provider often needs a set of data in order to generate an accurate analytics function (which could be composed of several functions/queries) that performs the desired analytics against the data. The data owner, by providing the masked dataset instead of the initial dataset, gives the analytics provider data to generate an appropriate analytics function without revealing the sensitive data of the initial dataset. The generated analytics function can then be made available to the data owner to invoke against the initial dataset that contains the true (unmasked) data, thus delivering the requested analytics results specific to the real data against which the analytics was intended to be run.

Thus, the masking method can be selected/specified by the data owner/customer of the analytics provider. The customer does not know the analytics functions that will be generated or which data/data fields the analytics provider will need access to in generating those the analytics functions, but past experiences and machine learning can inform of the particular functions that may be run and/or data fields that may be needed for purposes of generating the analytics functions, and therefore can inform which fields may need to be passed and/or masked. In some examples, the selection of the masking method is based in part on a prediction of the type of analytics/functions that the analytics provider will run on the dataset, the particular sensitive and/or non-sensitive data fields identified as discussed above, and/or this understanding of current/past relationships between the analytics requirements (informed by the analytics particularly being requested by the customer) and corresponding data fields that should be masked. Hence, the selection and application of the masking method by the customer can be based at least in part on (i) which data fields are identified as being sensitive together with (ii) an expectation (on the part of the customer) of which data fields, of the initial data set, would ultimately be used in performing the requested analytics. If any data fields executed to be used are sensitive, then they can be masked. Other sensitive data fields of the initial dataset can be masked as well or omitted altogether from the masked dataset.

The particular masking method, which in some examples is a hash function, to mask data and/or mappings between data fields and subject entity (e.g. user) IDs remains private to the data owner, meaning the analytics provider does not have knowledge of what was masked and/or the method by which it was masked. Based on the above identification of sensitive/non-sensitive attributes and what attributes are expected to be used in generating the analytics function, the system can mask the sensitive data fields of the initial dataset that are going to be sent to the analytics provider as part of the masked dataset. Masking a data field refers to (i) changing (which encompasses deleting, editing, augmenting, randomizing, etc.) subject entity data for that data field/attribute and/or (ii) changing (deleting/removing/remapping) one or mapping(s) between that data field and one or more other data fields of the dataset. In some examples, the masking masks a data field by masking the attributes for each of the entities, in order words by changing the values of those attributes (for instance changing a 9-digit Social Security Number to be '111-11-1111' or 'XXX-XX-XXXX') and/or using an equation to randomly remap any mappings and relationships that data field has from one set of fields to a different set of fields. In other examples of changing the mappings, the mappings are removed/deleted so that the connections between attributes no longer exist.

It is noted that the particular masking method that a data owner uses can change as desired. The data owner could select a different masking method each time the data owner requests analytics by the AP, whether for the same or a different dataset. New and/or different randomization and mapping strategies could be used to prevent the AP from understanding the data owner's randomized inputs over time and therefore further ensure entity privacy.

Figure 2:
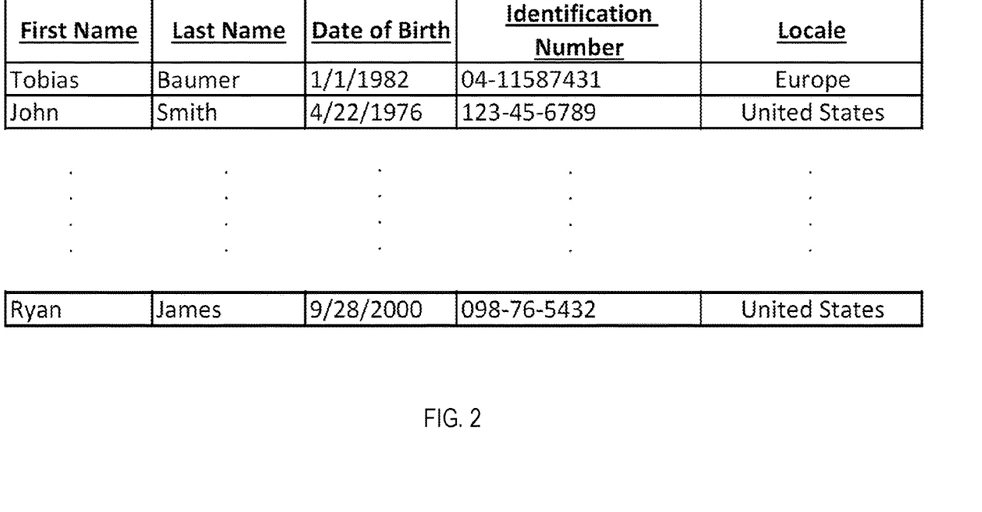
FIG. 2 depicts an example of an initial dataset.

By way of specific example, refer initially to FIG. 2 which depicts an example of an initial dataset. The example dataset is very basic in this example, with only three records for three different subject entities being shown, and just five data fields/attributes for each of the records. Each record includes a first name, last name, data of birth, identification number and locale. The identification number is a unique number assigned by the subject entity's locale, in this example a country, and is uniquely identifying of the subject entity in that locale. Assume in this basic example that just the identification number data field is considered sensitive.

Figure 3:
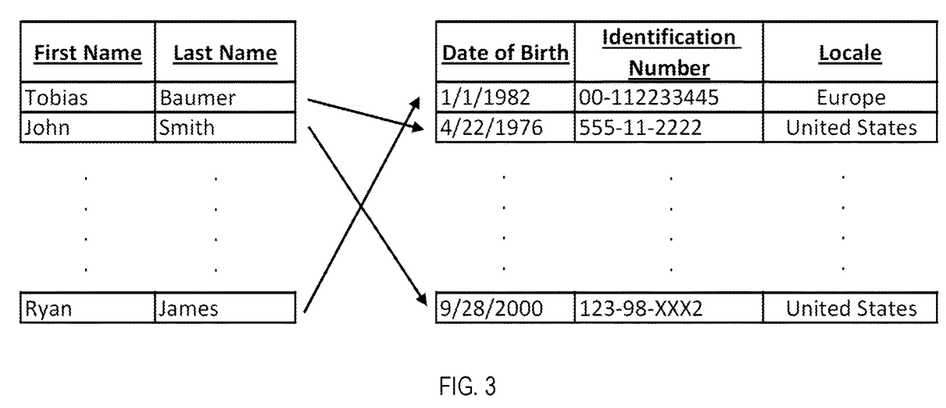
FIG. 3 depicts an example of a masked dataset.

FIG. 3 depicts example of a masked dataset, which is the initial dataset from FIG. 2 but with a masking method applied that masks data of the sensitive data field and shows (conceptually) remapping that the masking method has applied. The masking method here has masked the identification number for each of the three subject entities, replacing the respective identification numbers with similarly-formatted random numbers/letters. In addition, remappings have remapped some of the data fields. The first and last name data fields for the Tobias Baumer entity has been remapped to the data of birth, masked identification number, and locale of the John Smith entity. The first and last name fields for the John Smith entity has been remapped to the date of birth, masked identification number, and locale of the Ryan James entity, and the first and last name fields of the Ryan James entity has been remapped to the date of birth, identification number, and locale of the Tobias Baumer entity. The first names, last names, dates of birth, and locales are not considered sensitive in this example, and the data owner in this example is satisfied that the initial dataset has been sufficiently anonymized by the masking of the Identification Number attribute in combination with the remappings that have changed the mappings between the identification number/date of birth/locale attributes of each entity and the first/last name attributes of those entities. In this example, the masking method includes both changing entity data (the identification number data field) and remapping some data fields to other data fields. In practice, the masking method can be as complex or simple as the data owner desires.

Once the masked dataset has been produced, it is then provided to the analytics provider with a request for analytics processing. Since what is sent is the masked dataset and information about the masking method and which data of that dataset has and has not been masked are not known to the AP or ascertainable from the masked dataset itself, the data owner safely conveys data to which AP can apply its analytical expertise in generating an appropriate analytics function that performs the requested analytics if run against the initial dataset. On the AP side, again which utilizes a computer system to perform aspects discussed herein, the AP system understands the masked dataset as if it is real, unmasked data. In fact, the AP may be completely unaware that it is dealing with masked data, though it may be desired in some cases that the AP be alerted to the fact that the data has been masked in order to dissuade actors on the AP side from attempting to abuse the data. Meanwhile the AP system also understands, based on the customer's request for analytics processing, the particular analytics requirements based on which the AP will generate the required logic to perform the requested analytics. The AP system then derives/generates based on the masked data the analytics function to be used to accomplish the requested analytics. A goal of this, from the perspective of the data owner, is for the AP to provide an analytics function that works properly on the real data—the initial dataset. A goal may be to preserve the analytics output (measured in terms of accuracy, precision, etc.) on a statistical level when the generated function is applied to the initial dataset, despite having been generated based on the masked dataset. In other words, it is desired that the AP be able to generate an analytics function that is consistent in terms of what it produces for the masked dataset compared to what it would have produced if the dataset provided to the AP was the initial dataset. 'Consistent' in this context refers not necessarily to literally the same output values, but rather the same building blocks to produce correct analytics outputs given the input dataset. In this regard, efforts can be made to help ensure that the AP system generates the analytics function agnostic to the actual (unmasked) data fields.

In accordance with another aspect, the AP system conveys to the customer system the generated analytics function that was generated based on the masked dataset and that is configured to perform the desired analytics processing on the initial dataset held by the customer, and does so in response to the customer's request for analytics processing. Thus, instead of the AP running the analytics function on its side against the initial dataset which it does not have access to, it passes the analytics function to the data owner. The generated function can follow a functional programming paradigm; the generated function can be generated as logic (which may be several functions) written in functional programming that can be invoked and run against the initial dataset to perform the analytics processing on the initial dataset. In other words, the logic of the generated functions can be passed or made available to the customer for it to run against the initial dataset, enabling the customer to retain the initial dataset and thus avoid exposing the real data. This is as opposed to a conventional situation in which the AP run functions against real data on the AP side and sends the data results back to the data owner.

In some examples, the AP side passes the generated function in an encrypted form, which the customer side can then decrypt and prepare to be run against the initial dataset of the customer. Since analytics functions can be proprietary in nature, the AP might desire that the logic in decrypted form not be viewable by the customer. In these embodiments, a secure engine is provided by the AP as a software module and made available to the customer. The secure engine can intake the generated function and perform the decryption while retaining the decrypted logic securely such that it is not viewable by the customer. The customer can then use the engine to execute the function (which practically may be tens or hundreds of functional programming functions) against the customer's initial dataset and obtain the results of the analytics processing.

Further details of an example sequence of events is provided to illustrate aspects described herein. In situations where the data owner wants an analytics provider to perform analytics against data in the custody of the data owner, a computer system of the data owner identifies a set/number of data fields of the dataset to be analyzed, a list of the sensitive data fields of that set of data fields, and a list of uniquely identifying data fields of that set of data fields. By uniquely identifying is meant that the field holds data that uniquely identifies a specific subject entity, such as an individual person. Example uniquely identifying data fields are an employee or user ID, an employee name, and an employee address, which could be used to uniquely identify a user/person. An example sensitive data field is a government-issued identification number, such as a Social Security Number (SSN) or a tax identification number. A sensitive data field (such as an SSN) may also be a uniquely identifying data field and vice versa, though this is not always the case. For instance, information about an individual but that, by itself, cannot uniquely identify the individual may nevertheless be considered sensitive information. The data owner's system also identifies mappings of sensitive data fields to other data fields, for instance fields mapping to/between uniquely identified subject entities. Finally, the data owner's system selects and implements a data randomization/masking logic that can randomize/mask sensitive data and/or the relationships between sensitive data fields and other data fields (sensitive or non-sensitive) such that the results of the analytics function delivered back to the customer remain accurate when performed on the real data of the initial dataset. The analytics provider does not know which dataset fields were masked, let alone the logic/masking method used to mask the data, which knowledge instead rests with the requesting customer.

It is noted that the masking method could include just masking data of one or more fields, just remapping some fields, a combination of both, and/or any other changes to anonymize/mask data of the dataset. Additionally or alternatively, the masked dataset could include a homomorphically encrypted version of the data fields that preserves the referential integrity of the relationships/mappings but without revealing personal information. In any case, the masked dataset that is sent to the AP may be encrypted/randomized/masked in such a way that the relationships across the data fields/columns are preserved and recoverable on the data owner side when the data owner receives the generated analytics functions from the AP.

The functional programming paradigm can be used in various aspects of the exchanges between the data owner and the AP. One embodiment provides a collection of application programming interfaces (APIs) for invocation by the data owner and a collection of APIs for invocation by the AP. On the data owner side, there may be APIs for the data owner to pass masked data to an API provider system, call/select/specify/invoke randomization logic or other masking operation for randomizing/masking data being passed to the API provider and/or data already accessible to the API provider, or retrieve or invoke generated analytics functions against a dataset, as examples. In this regard, the masking/randomization could be achieved with functional programming-based logic snippets employed for the masking/randomization, and those could change to prevent the AP from learning the masking method(s) being applied. On the AP side, there may be APIs for the AP to retrieve a dataset, invoke processing against datasets to generate analytics functions, or provide generated analytics functions/ logic, as examples. As noted above, the generated analytics functions could be generated logic written in functional programming that is passed via APIs to the data owner for invocation, either on the API provider system or elsewhere.

Figure 4:
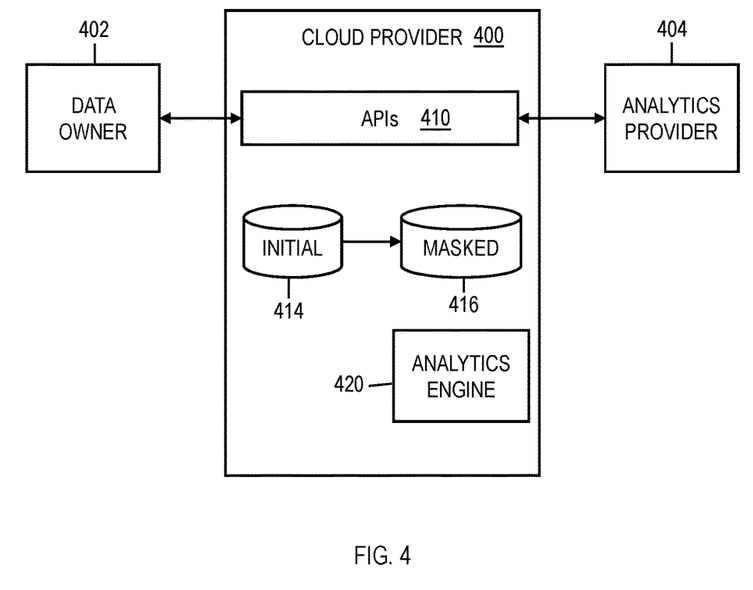
FIG. 4 depicts another example environment to incorporate and use aspects described herein.

FIG. 4 depicts another example environment to incorporate and use aspects described herein. In this example, a cloud provider 400 (which could encompass one or more private/public clouds) hosts and exposes APIs 410 to data owner 402 and analytics provider 404. The APIs as explained above facilitate at least communication/data passing between the data owner 402 and analytics provider 404. In this particular example, the cloud provider 400 is a trusted cloud (such as a private cloud of the data owner) that hosts the datasets 414, 416 and an analytics engine 420. The data owner's initial dataset 414 is hosted on the cloud 400 and the data owner invokes one or more of APIs 400 to select and apply a masking method that processes the initial dataset into a masked dataset 416 by applying the masking method to the initial dataset 414. The data owner 402 also requests analytics processing of the analytics provider, either via an API or through a separate channel. The analytics provider 404 accesses the masked dataset 416 in generating the analytics function. The processing to generate the analytics function could be performed partly or wholly by the cloud provider and/or by the analytics provider 404. In some examples, the analytics provider 404 pulls a copy of the masked dataset 416 or portions thereof to a local system of the analytics provider and generates the analytics function entirely on its side. In other examples, the analytics provider 404 invokes one or more of APIs 400 for the cloud provider to perform various processing to generate the analytics function on the cloud. In yet further examples, the generation is a combination of the two.

In any case, the generated analytics function is 'received' by the data owner 402—in this example the function is made available for access/use by the data owner to run against the initial dataset 414. The analytics engine 420 facilitates the execution of the analytics function against the initial dataset, and therefore contains the necessary software to execute the logic of the generated analytics function. The generated function could, if desired, be kept hidden from the data owner 402 and/or encrypted such that the data owner 402 cannot see the logic of the generated function but the analytics engine 420 can execute the function to perform the analytics against the initial dataset 414.

In the particular example of FIG. 4, a service provider of the cloud holds customer data (e.g. an initial dataset) and the customer invokes a masking method against the initial dataset to provide the masked dataset. The service provider then works with the analytics provider to provide the masked dataset to the AP. It could send the dataset to the analytics provider or provided the analytics provider with access to the data even if the data is not shipped from the cloud provider to the analytics provider, as examples. The analytics provider generates an analytics function (either on the service provider's cloud or elsewhere) and the service provider sends the analytics function down to its customer 402 or alternatively applies the analytics function to the initial dataset that it hosts and then provides the analytics results to its customer, the data owner.

In alternative embodiments, and for security or other reasons, some aspects described as being performed on the cloud in FIG. 4 could instead be performed by the data owner 402 or analytics provider 404. As one example, the initial dataset is not hosted on the cloud and instead the masked dataset is generated on a data owner system and uploaded to the cloud provider 400. Additionally or alternatively, the analytics provider 404 could download the masked dataset 416 and generate the analytics function on its system then upload the function to the cloud 400. Additionally or alternatively, the generated analytics function could be pulled to a data owner system for execution against the initial dataset housed by the data owner instead of on a cloud.

Yet another embodiment of aspects described herein is as follows, which can optionally be combined with aspects described above: The data owner generates a fake dataset based on and modeled after a real dataset, and sends the fake dataset to the analytics provider so that the analytics provider can understand the structure and the schema of the fake dataset. The data owner requests that the analytics provider perform specific analytics (A1 and A2, as the 'requirements' for the analytics) on the fake dataset. The analytics company understands A1 and A2 and, based on that, sends to the data owner through an API call in return a list of data fields (e.g. f1, f2, f3, f4, and f5) from the total fields (e.g. f1-f10) that need to be accessed for the analytics, and dataset query/ queries Q that are to be performed on the dataset in performing the analytics. This effectively tells the data owner which fields are of interest given the requested analytics so that the data owner can focus on which data to later pass to the analytics provider (instead of passing the entire dataset as would be done conventionally). It can also be used for training purposes since the data owner comes to learn from the analytics provider which data fields are needed for which requested analytics, e.g. which fields are needed for A1, which fields are needed for A2. The data owner could learn to proactively limit future requests to involve only those fields when interacting with the AP for analytics A1 or A2.

The data owner receives the information from the AP through the API call and can then prune and mask/randomize the real dataset, in particular just the relevant portions thereof based on what the AP provided to inform of which data fields are needed, into a masked dataset such that the final outcome of Q remains the same. In other words, the query results remain agnostic of the final result analytics or patterns. The data owner sends the masked dataset to the AP, which receives the masked dataset and uses it to generate the analytics function for the data owner customer to consume against the real dataset. As an example, the logic is sent to the data owner/customer to execute on its own systems or on a cloud environment, such as the data owner's private cloud. The final analytics against the initial/real dataset is then performed on the data owner's private cloud (as an example), while the analytics method and logic remains protected and not directly accessible by the customer, in order to protect the analytics methods employed by the analytics provider. Meanwhile, the analytics provider can delete the masked dataset that it has, and the data owner can delete any data relating to the generated analytics function. This retention/deletion of data or functions can be governed by a service contract in place between the data owner and the analytics provider.

Figure 5:
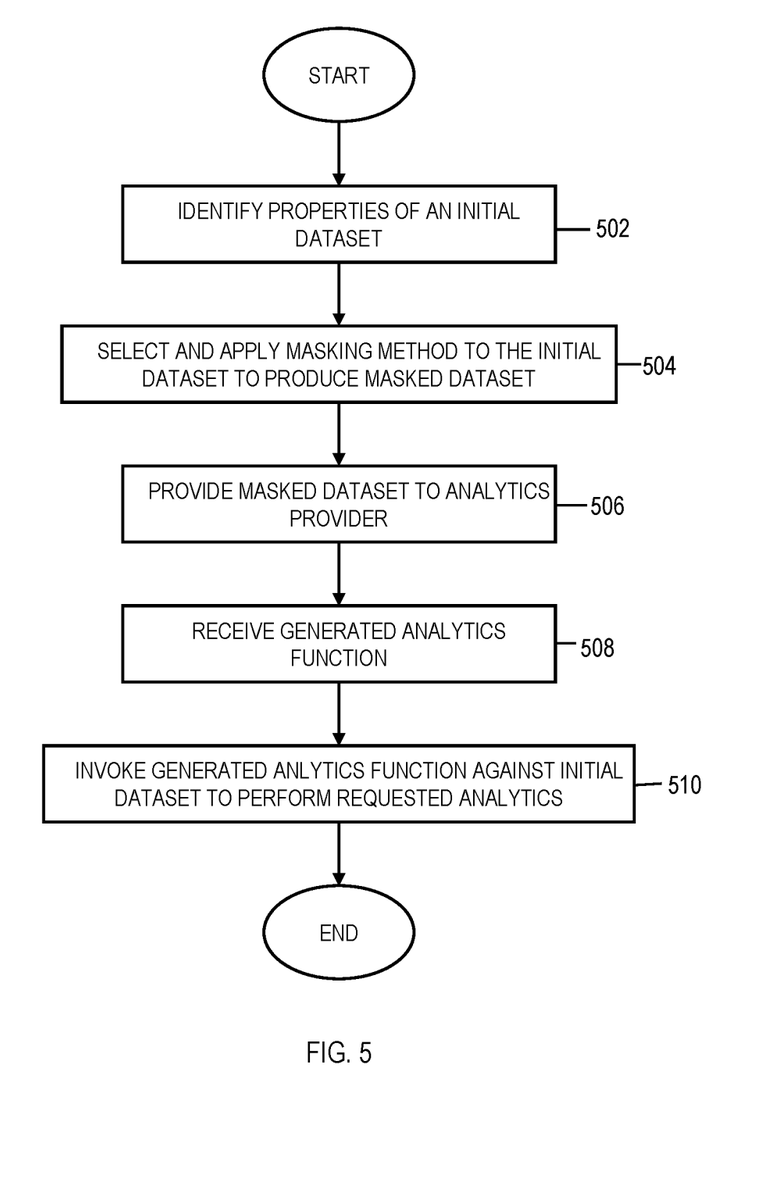
FIG. 5 depicts an example method for secure data analytics, in accordance with aspects described herein.

FIG. 5 depicts an example process for secure data analytics in accordance with aspects described herein. In some examples, the process is performed by one or more computer systems, such as those described herein, which may include one or more computer systems of a data owner, one or more cloud servers, and/or one or more other computer systems.

The process includes identifying (502) properties of an initial dataset on/against which analytics processing is to be performed. Example properties can include sensitive and/or non-sensitive data fields of the initial dataset, mappings and/or dependencies between the sensitive data fields and other data fields (either sensitive or non-sensitive) of the dataset, and any other properties of the dataset. The initial dataset is original or 'real' data, some of which may be sensitive and/or uniquely identifying of subject entities represented in the dataset. Some sensitive data fields can include data fields that are also uniquely identifying of specific people to which data records of the initial dataset correspond. In some examples, properties of the initial dataset can be informed at least in part by metadata about the initial dataset, for instance a schema of the dataset.

In a particular example, the identification of sensitive or other data fields and mappings of the initial dataset includes a system generating and recommending to an owner of the initial dataset a list of candidate data fields of the initial dataset, the list of candidate data fields indicating candidate data fields for deeming sensitive and/or candidate data fields for deeming non-sensitive. The list may be subject to change by the owner of the initial dataset for a final decision of which data fields are identified as being sensitive data fields.

In some embodiments, the identification of sensitive data fields and/or data fields expected to be used in the analytics processing to be performed can be aided by inputting properties of the dataset and indications of analytics requirements (informed by which analytics the data owner is to request) into a machine learning model that is trained to predict which data fields may be used in the requested analytics processing. The machine learning model could output indications of the data fields, of the initial dataset, that the model predicts will be used by the analytics provider and/or which data fields are sensitive data fields that the data owner may desire to mask, thereby generating and recommending those fields to the data owner. Thus, as part of generating/recommending a list of candidate data fields, the process includes inputting an indication of requirements for the analytics processing into a machine learning model that has been trained based on knowledge of analytics requirements and data field use corresponding to those analytics requirements, and then receiving, as an output of the machine learning model, a prediction and identification of data fields, of the initial dataset, based on the indication of requirements of the analytics processing, that are expected to be used in the analytics processing. The identified sensitive data fields—the ones that the data owner finalizes as being the sensitive data fields to mask—can then be identified based at least in part on that output of the machine learning model.

Whether or not a model is used in informing the data fields, of the initial data set, expected to be used in performance of the analytics processing on the initial dataset, it is based on the expectation of data fields to be used and on the identified sensitive data fields that the method selects and applies (504) a masking method to the initial dataset to mask the sensitive data fields of the initial dataset and produce a masked dataset. As examples, the particular masking method could be entirely defined or specified by the data owner, or in some cases could be selected from predefined masking methods, perhaps that are customized/parameterized by the data owner in order to randomize the masking that occurs pursuant to that predefined method. Additionally/alternatively, the particular masking method could be selected randomly from a collection of possible masking methods. A masking method could be as simple as a single mask strategy applied to all data fields to be masked or as complex as applying varying functions to varying data fields, depending on the specifics of the method. A single masking method therefore could encompass several complex functions applying to different data and fields of the dataset.

In one example aspect, the selecting and applying (504) can select and apply a masking method that includes changing the mappings between the sensitive data fields and the other data fields. This unlinks various data about a single entity from other data about the entity and optionally remaps it to data of another entity. Sensitive health data about a person may be de-sensitized if it is disassociated from that person, for instance. Changing mappings between sensitive data field(s) and other data field(s) can include (i) removing from at least one sensitive data field of the sensitive data fields any mapping it has to any other data field of the initial dataset, and/or (ii) randomizing at least some of the mappings to randomize relationships between the sensitive data fields and the other data fields.

In another example aspect, in addition or as an alternative to changing the mappings, the selecting and applying (504) selects and applies a masking method that includes changing/randomizing data of at least some sensitive data fields of the identified sensitive data fields. This includes changing specific attribute data for one or more entities of the dataset.

In yet another example aspect of the selecting and applying (504), it selects and applies a masking method that includes homomorphically encrypting data of the sensitive data fields, where the homomorphically encrypting preserves referential integrity of mappings between the sensitive data fields and the other data fields but without uniquely identifying entities (e.g. people) to which data records of the initial dataset correspond.

Applying the masking method to the initial dataset provides a masked dataset. The process of FIG. 5 then provides (506) this masked dataset to an analytics provider with a request for the analytics processing. The request for analytics processing informs the analytics provider about the analytics that the data owner is specifically requesting. The data owner could optionally alert the analytics provider that the masked dataset is a dataset of masked data that was masked from initial data.

The analytics provider at that point generates an analytics function that, when run, performs the requested analytics against an input dataset. In practice, the generated analytics function could include a collection of functional programming functions. The analytics function is generated by the analytics provider in part based on the provider's use of the masked dataset to compose functions that perform the requested analytics. More importantly from the perspective of the data owner, the analytics function, when run against the initial dataset held by the data owner, is configured to perform the analytics processing that the data owner desires to be performed on the initial dataset. The data owner, in response to providing the masked dataset, receives (508) the analytics function that the analytics provider generated based on the masked dataset but which the data owner can invoke against the initial, non-masked dataset. The process accordingly proceeds with invoking (510) the generated analytics function against the initial dataset to perform the analytics processing on the initial dataset. The analytics processing provides some output, typically in the form of output data, for use by the data owner. The invocation of the analytics function can be triggered automatically or by the data owner.

In particular examples, the generated analytics function includes logic written in functional programming, and invoking (510) the generated analytics function includes running the functional programming to perform the analytics processing on the initial dataset. In some instances, the generated analytics function is provided and received in encrypted form. This may be desired for security reasons and/or because of the proprietary natures of the analytics functions. In this case, invoking the generated analytics function includes decrypting the analytics function in encrypted form to a decrypted form for execution. This could be aided in some examples by an analytics engine configured to take as input an analytics function in encrypted or unencrypted form and an initial dataset and execute the analytics function against the dataset to output results of the analytics processing. The analytics engine could be secure code distributed to data owner systems and/or hosted on the cloud, and could execute the functions in a 'black box' style that takes inputs and delivers outputs but does not present its processing and functions in any manner observable to outside software/entities, such as the data owner of a system thereof. In some example, the engine is built by the AP and provided as client software for data owner systems and/or provided in a secure cloud environment for invocation.

In whatever masking method is selected and applied, the selection can be made to mask uniquely identifying information of people (or other entities) to which data records of the initial dataset correspond while both maintaining accuracy of the generated analytics function, generated based on the masked dataset, when using it for analytics processing on the initial dataset, and minimizing reverse engineerability of the masked dataset to reveal the masking method.

In some embodiments, the initial dataset is hosted on a cloud computing environment that also hosts an application programming interface (API). The selection and application of the masking method, the provision of the masked dataset and the receipt of the generated analytics function, and/or the invocation of the generated analytics function could individually or all be performed by the cloud computing environment based on invocation(s) of the API by the owner of the initial dataset. Additionally or alternatively, the API could expose interfaces for invocation by the analytics provider to perform aspects of its involvement, for instance generation or sending/provision of analytics functions to the data owner. In some examples, both the data owner and analytics provider perform their respective steps of the process by making parameterized API calls to the cloud environment, instructing the cloud environment to perform the aspects discussed herein. Control over access/use of the data in the cloud environment can be accomplished by controlling privileges surrounding use of the different API calls.

Although various examples are provided, variations are possible without departing from a spirit of the claimed aspects.

Figure 6:
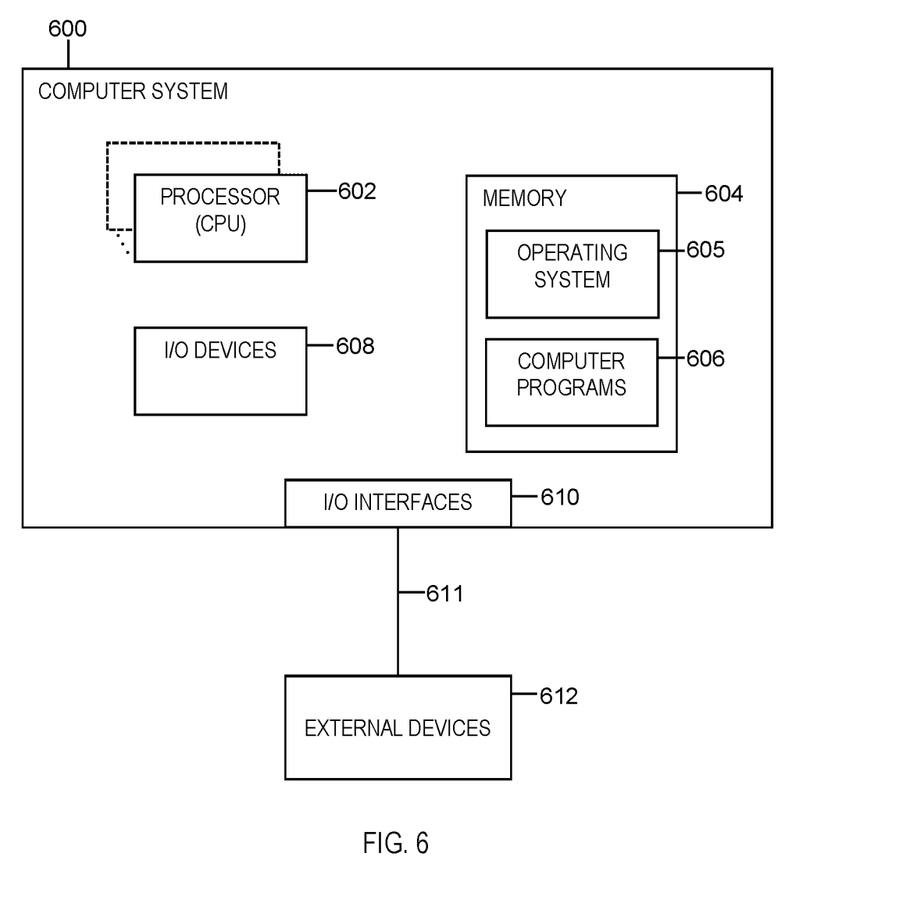
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
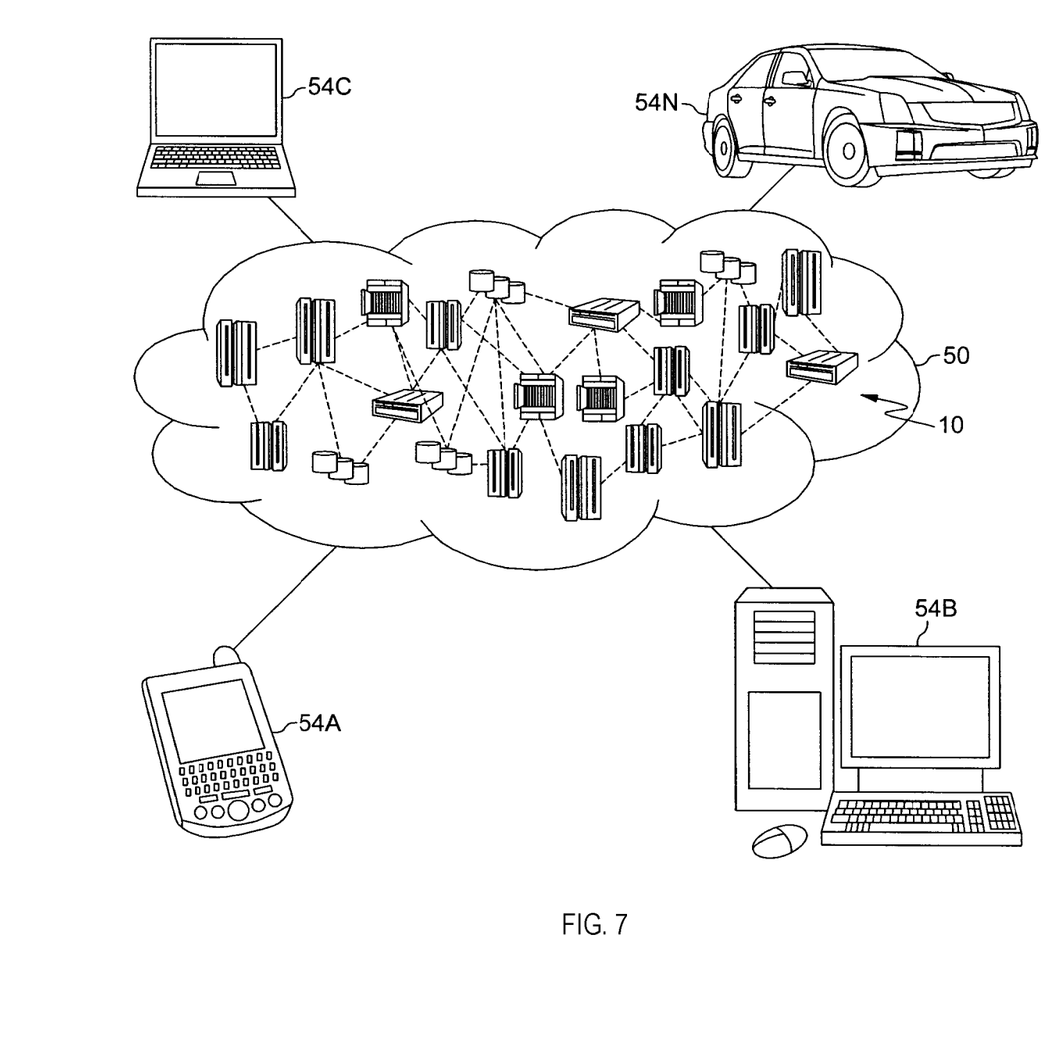
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
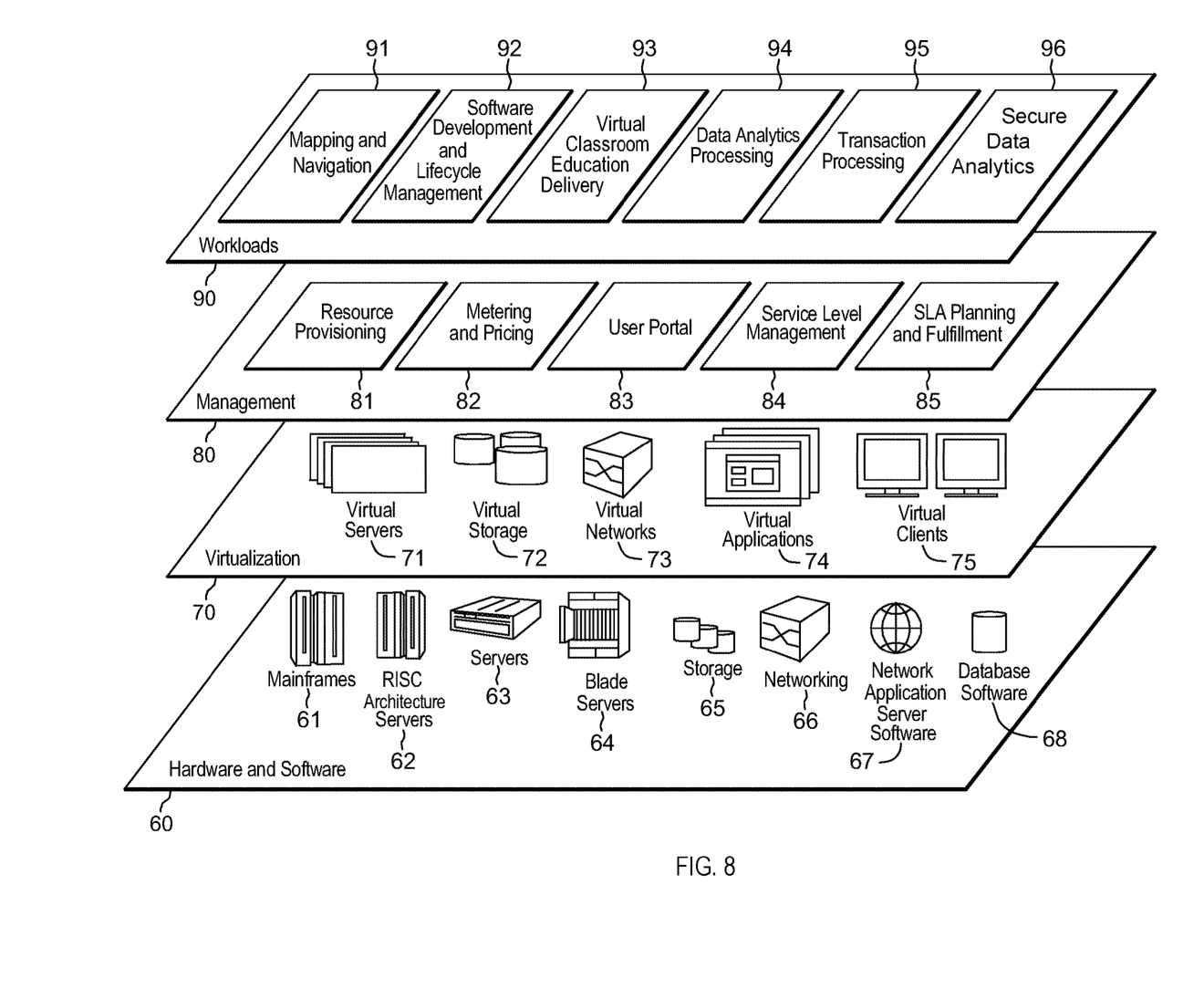
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data analytics 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions D-2 Oct. 27, 2020 by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   Identifying, by a computer system, sensitive data fields of an initial dataset and mappings between the identified sensitive data fields and other data fields of the initial dataset, wherein analytics processing is to be performed on data of the initial dataset;
   based on an expectation of data fields, of the initial data set, to be used in performance of the analytics processing on the data of the initial dataset, and based on the identified sensitive data fields, selecting and applying, by a dataset owner of the initial dataset, a masking method to at least some of the initial dataset to mask the identified sensitive data fields of the initial dataset and produce a masked dataset;
   providing, by the dataset owner, the masked dataset to an analytics provider with a request for the analytics processing, and receiving from the analytics provider, in response to the providing, a generated analytics function, generated based on the masked dataset, that is configured to perform the analytics processing on the data of the initial dataset; and
   invoking, by the dataset owner, the generated analytics function against the initial dataset to perform the analytics processing on the data of the initial dataset.

2. The method of claim 1, wherein the generated analytics function comprises logic written in functional programming, and wherein the invoking the generated analytics function comprises running the functional programming to perform the analytics processing.

3. The method of claim 1, wherein the identifying the sensitive data fields and mappings comprises generating and recommending to the dataset owner a list of candidate data fields of the initial dataset, the list of candidate data fields subject to change by the dataset owner for final decision of the identified sensitive data fields.

4. The method of claim 3, wherein the generating and recommending comprises:
   inputting an indication of requirements for the analytics processing into a machine learning model, the machine learning model trained based on knowledge of analytics requirements and data field use corresponding to those analytics requirements; and
   receiving as an output of the machine learning model a prediction and identification of a set of data fields, of the initial dataset, based on the indication of requirements of the analytics processing, that are expected to be used in the analytics processing, wherein the identified sensitive data fields are identified based at least in part on the output of the machine learning model.

5. The method of claim 1, wherein the selecting and applying selects and applies a masking method that includes changing the mappings between the identified sensitive data fields and the other data fields.

6. The method of claim 5, wherein the changing the mappings between the identified sensitive data fields and the other data fields comprises at least one selected from the group consisting of: (i) removing, from at least one sensitive data field of the identified sensitive data fields, any mapping it has to any other data field of the initial dataset, and (ii) randomizing the mappings between the identified sensitive data fields and the other data fields to randomize relationships between the identified sensitive data fields and the other data fields.

7. The method of claim 1, wherein the selecting and applying selects and applies a masking method that includes randomizing data contained in at least some sensitive data fields of the identified sensitive data fields.

8. The method of claim 1, wherein the selecting and applying selects and applies a masking method that includes homomorphically encrypting data of the identified sensitive data fields, wherein the homomorphically encrypting preserves referential integrity of mappings between the identified sensitive data fields and the other data fields without uniquely identifying people to which data records of the initial dataset correspond.

9. The method of claim 1, wherein the selected masking method is selected to mask uniquely identifying information of people to which data records of the initial dataset correspond while (i) maintaining accuracy of the generated analytics function, generated based on the masked dataset, when using it for analytics processing on the initial dataset, and (ii) minimizing reverse engineerability of the masked dataset to reveal the masking method.

10. The method of claim 1, wherein the initial dataset is hosted on a cloud computing environment that also hosts an application programming interface (API), and wherein the selecting and applying the masking method, the providing the masked dataset and receiving the generated analytics function, and the invoking the generated analytics function is performed by the cloud computing environment based on invocation of the API by the dataset owner.

11. The method of claim 1, wherein the identified sensitive data fields comprise data fields that are uniquely identifying of people to which data records of the initial dataset correspond.

12. The method of claim 1, wherein the generated analytics function is received in encrypted form, and wherein the invoking the generated analytics function comprises decrypting the generated analytics function to a decrypted form for execution.

13. The method of claim 1, further comprising identifying properties of the initial dataset using a schema of the initial dataset, the properties comprising mappings and dependencies between data fields of the initial dataset.

14. The method of claim 1, further comprising alerting the analytics provider that the masked dataset is a dataset of masked data that was masked from initial data.

15. A computer system comprising:
   a memory storing program instructions; and
   a processor in communication with the memory, and configured to execute the program instructions to cause the computer system to perform a method comprising:
      identifying, by the computer system, sensitive data fields of an initial dataset and mappings between the identified sensitive data fields and other data fields of the initial dataset, wherein analytics processing is to be performed on data of the initial dataset;
      based on an expectation of data fields, of the initial data set, to be used in performance of the analytics processing on the data of the initial dataset, and based on the identified sensitive data fields, selecting and applying, by a dataset owner of the initial dataset, a masking method to at least some of the initial dataset to mask the identified sensitive data fields of the initial dataset and produce a masked dataset;
      providing, by the dataset owner, the masked dataset to an analytics provider with a request for the analytics processing, and receiving from the analytics provider, in response to the providing, a generated analytics function, generated based on the masked dataset, that is configured to perform the analytics processing on the data of the initial dataset; and invoking, by the dataset owner, the generated analytics function against the initial dataset to perform the analytics processing on the data of the initial dataset.

16. The computer system of claim 15, wherein the identifying the sensitive data fields and mappings comprises generating and recommending to the dataset owner a list of candidate data fields of the initial dataset, the list of candidate data fields subject to change by the dataset owner for final decision of the identified sensitive data fields, and wherein the generating and recommending comprises:

inputting an indication of requirements for the analytics processing into a machine learning model, the machine learning model trained based on knowledge of analytics requirements and data field use corresponding to those analytics requirements; and receiving as an output of the machine learning model a prediction and identification of a set of data fields, of the initial dataset, based on the indication of requirements of the analytics processing, that are expected to be used in the analytics processing, wherein the identified sensitive data fields are identified based at least in part on the output of the machine learning model.

17. The computer system of claim 15, wherein the selected masking method is selected to mask uniquely identifying information of people to which data records of the initial dataset correspond while (i) maintaining accuracy of the generated analytics function, generated based on the masked dataset, when using it for analytics processing on the initial dataset, and (ii) minimizing reverse engineerability of the masked dataset to reveal the masking method.

18. A computer program product comprising:

a computer readable storage medium readable by a processing circuit and storing instructions that, when executed, cause the processing circuit to perform a method comprising:

identifying, by a computer system, sensitive data fields of an initial dataset and mappings between the identified sensitive data fields and other data fields of the initial dataset, wherein analytics processing is to be performed on data of the initial dataset;

based on an expectation of data fields, of the initial data set, to be used in performance of the analytics processing on the data of the initial dataset, and based on the identified sensitive data fields, selecting and applying, by a dataset owner of the initial dataset, a masking method to at least some of the initial dataset to mask the identified sensitive data fields of the initial dataset and produce a masked dataset;

providing, by the dataset owner, the masked dataset to an analytics provider with a request for the analytics processing, and receiving from the analytics provider, in response to the providing, a generated analytics function, generated based on the masked dataset, that is configured to perform the analytics processing on the data of the initial dataset; and invoking, by the dataset owner, the generated analytics function against the initial dataset to perform the analytics processing on the data of the initial dataset.

19. The computer program product of claim 18, wherein the identifying the sensitive data fields and mappings comprises generating and recommending to the dataset owner a list of candidate data fields of the initial dataset, the list of candidate data fields subject to change by the dataset owner for final decision of the identified sensitive data fields, and wherein the generating and recommending comprises:

inputting an indication of requirements for the analytics processing into a machine learning model, the machine learning model trained based on knowledge of analytics requirements and data field use corresponding to those analytics requirements; and receiving as an output of the machine learning model a prediction and identification of a set of data fields, of the initial dataset, based on the indication of requirements of the analytics processing, that are expected to be used in the analytics processing, wherein the identified sensitive data fields are identified based at least in part on the output of the machine learning model.

20. The computer program produce of claim 18, wherein the selected masking method is selected to mask uniquely identifying information of people to which data records of the initial dataset correspond while (i) maintaining accuracy of the generated analytics function, generated based on the masked dataset, when using it for analytics processing on the initial dataset, and (ii) minimizing reverse engineerability of the masked dataset to reveal the masking method.

* * * * *